United States Patent
Moore

[15] 3,696,778
[45] Oct. 10, 1972

[54] BREADING MACHINE
[72] Inventor: George A. Moore, 843 North Dellrose, Wichita, Kans. 67208
[22] Filed: Nov. 17, 1969
[21] Appl. No.: 877,299

[52] U.S. Cl. .............................118/9, 118/19, 259/3
[51] Int. Cl. .................................................A23g 3/26
[58] Field of Search ..........118/9, 11, 19, 418; 259/3; 134/158, 159; 117/109

[56] References Cited
UNITED STATES PATENTS

| | | | |
|---|---|---|---|
| 1,199,211 | 9/1916 | Simons | 134/159 |
| 1,460,400 | 7/1923 | Belknap | 134/158 X |
| 182,209 | 9/1876 | Mary | 118/418 X |
| 475,840 | 5/1892 | Woods | 118/19 |
| 1,315,665 | 9/1919 | Hamilton | 118/19 |
| 1,842,101 | 1/1932 | Kaufmann | 118/19 |
| 1,881,549 | 10/1932 | Hatch | 118/19 |
| 1,955,552 | 4/1934 | Kruger | 118/418 X |
| 3,095,326 | 6/1963 | Green et al. | 118/19 X |
| 3,097,967 | 7/1963 | Fries et al. | 118/19 |

Primary Examiner—John P. McIntosh
Attorney—Robert E. Breidenthal

[57] ABSTRACT

A machine for breading pieces of fish, meat, such as cut chicken, and the like, which comprises a perforated container for the pieces mounted for rotation about a horizontal axis in an open-topped housing having a lid, such container means having an access opening normally closed by a latchable cover. A timer controlled power means is provided for rotating the container means, with means also being provided for disabling the power means when the lid is not closed. A hopper feeds breading into the housing, and the power means is coupled to a breading agitator in the hopper. The preferred container means comprises a rotatable receptacle in which a perforated basket is removably received, with the cover of the receptacle, when latched, retaining the basket in the receptacle. The housing has a closable discharge opening in its front through which breading can be discharged into a drawer that is extensible forwardly from beneath the housing.

9 Claims, 11 Drawing Figures

PATENTED OCT 10 1972

INVENTOR.
GEORGE A MOORE
BY Robert E. Breidenthal
ATTORNEY

INVENTOR.
GEORGE A MOORE
BY Robert E Breidenthal
ATTORNEY

INVENTOR.
GEORGE A MOORE
BY Robert E Buidenthal
ATTORNEY

BREADING MACHINE

The present invention relates to new and useful improvements in apparatus for treating the surfaces of articles, and more particularly pertains to a machine for breading food articles such as fish, cut chicken and the like.

The principal object is to provide a machine that will enable the operator thereof to apply breading to a substantial quantity of pieces of cut chicken or the like in a speedy and uniform fashion.

Another object is to provide a breading machine as set forth above that will minimize the extent to which the eyes and the respiratory system of the operator thereof will be irritated to exposure to the dust of the particulate or pulverized breading material (which usually includes a variety of spices and seasoning of very irritating nature).

Another object of the invention is to provide a breading machine requiring a short breading cycle, and which can be quickly charged with unbreaded pieces and also quickly discharged of pieces that have been breaded, whereby the duration of intervals between breading cycles can be minimized.

Another object is to provide a power driven machine requiring no operator attendance during an automatically timed breading cycle, whereby the operator can attend to other tasks such as preparing other pieces for the breading thereof, etc., during the breading cycle.

Yet another object is to provide a breading machine such that the same can be easily and thoroughly cleaned, and from which breading can be readily removed for storage, processing to remove lumps or balls therefrom, etc.

Final objects to be specifically set forth in the invention are to provide a machine which is simple and safe to operate, even by previously unskilled persons of very modest mechanical aptitude, and which is of reasonable cost in relation to a high degree of durability and reliability.

A broad aspect of the invention involves in a machine for breading pieces of food, an improved container for the pieces of food, comprising a basket receptacle mounted for rotation about a horizontal axis with the receptacle having an opening at a position radially remote from said axis, a cover for the receptacle for selectively opening and closing said opening, means for releasably retaining the cover in a position closing said opening, said container including a basket movable radially relative to said axis into and out of the basket receptacle through said opening when the cover is open, said receptacle, said basket and said cover being so constructed and arranged as to constitute a container for pieces of food and so that the cover will, when closed, retain the basket in the receptacle, and the container being perforated for the ingress and egress of breading.

Another broad aspect of the invention involves a breading machine comprising an open-topped housing defining a breading chamber therein adapted to contain breading, container means within the chamber for containing food articles to be breaded, means for mounting the container for rotation about a horizontal axis, said container means having an access opening, said container means including cover means for selectively opening and closing said opening, said container means being perforate for the ingress and egress of breading, radially extending vane means on the container means for elevating breading in the chamber and thence gravitationally discharging breading onto the container means during rotation of the latter, power means including an electric motor for rotating the container means, and means for controlling energization of said electric motor, said last means including timer means for terminating energization of the electric motor after a selected time interval and means independent of the timer means for enabling energization of the electric motor for a time interval sufficient to rotate the container means to a selected angular position within the chamber.

Other objects and novel aspects of the breading machine together with numerous advantages thereof will become manifest during the following description of preferred embodiments of the invention, such description to be taken in conjunction with the accompanying drawings illustrative of such embodiments, wherein:

Referring now to the drawings, wherein like numerals designate like parts throughout the various views, attention is initially directed to the form of the invention shown in FIGS. 1 through 10, inclusive.

The breading machine is designated generally at 10, and the same comprises a support frame designated generally at 12 on which is mounted a housing designated generally at 14 that is comprised of front and rear walls 16 and 18, respectively, end walls 20 and 22, and a forwardly and downwardly inclined bottom wall 24. The housing 14 defines an open-topped breading chamber 26.

The breading machine 10 includes a breading hopper designated generally at 28, and such hopper 28 is defined by the front and rear housing walls 16 and 18 having integral extensions 30 and 32, respectively, such extensions 30 and 32 terminating in vertically inclined edges joined by a vertically inclined end wall 34 that has its lower edge joined at 36 to the bottom wall 24 of the breading chamber 26. The arrangement is such that a hopper chamber 38 is defined by the housing end wall 20, the extensions 30 and 32 of the front and rear walls of the housing, and the inclined hopper end wall 34. The front and rear walls 16 and 18 as well as their extensions 30 and 32, and the walls 22 and 34 terminate in upper edges in a common horizontal plane, and the upper edge of the end wall 20 also terminates in or in very close proximity to such common horizontal plane, the purpose being so that a lid to be presently described can close the open tops of the breading chamber 26 and the hopper chamber 38.

Figure 3:
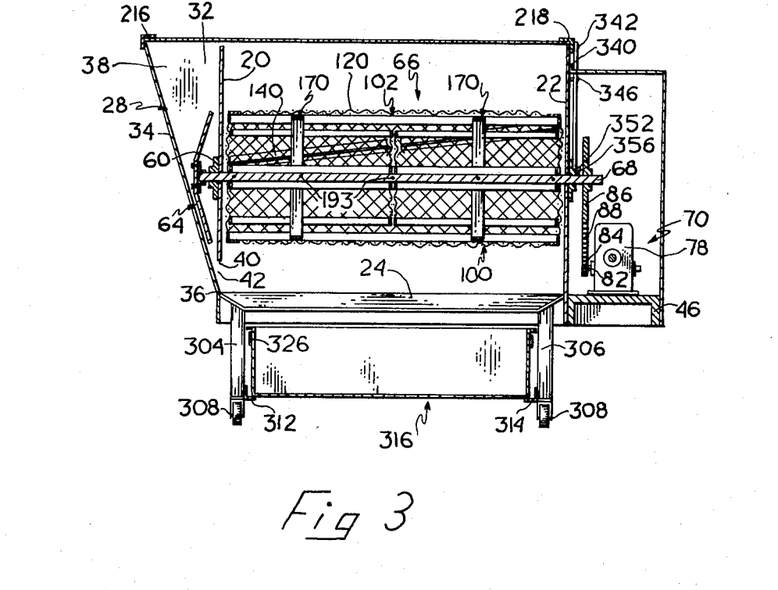
FIG. 3 is a vertical sectional view taken upon the plane of the section line 3—3 in subsequently described FIG. 4.

The lower edge 40 of the housing end wall 20 terminates in spaced relation from the housing bottom wall 24 and the hopper end wall 34 as best shown in FIG. 3 so as to define a hopper discharge opening 42 such that breading in the chamber 38 can gravitationally move into the bottom of the breading chamber 26.

An auxiliary housing designated generally at 44 is provided at the end of the housing 14 remote from the hopper 28, such auxiliary housing 44 being defined by a channel member 46 securely fastened in any suitable manner to the frame 12 and the end wall 22 of the housing 14, such channel 46 constituting the bottom wall of the auxiliary housing 44. The auxiliary housing also includes a top wall 48 secured to the frame 12 and housing 14 by fasteners 53, and an end wall 50 detachably secured to the channel 46 by means of threaded fasteners indicated at 52 in FIG. 1.

The front and rear walls 16 and 18 of the housing 14 include integral extensions 54 and 56 to constitute the front and rear walls of the auxiliary housing 44.

A shaft 58 extends horizontally through the housing 14 in parallelism with the front and rear walls 16 and 18 thereof, and such shaft 58 is journaled through bearings 60 and 62 carried by the end walls 20 and 22 respectively. As clearly shown in FIG. 3, the shaft 58 has one end thereof projecting into the hopper chamber 38, and an agitator means designated generally at 64 is mounted upon such projecting end of the shaft 58 for rotation therewith within the hopper chamber 38. A container means designated generally at 66 is mounted on that portion of the shaft 58 disposed within the housing 14 for rotation therewith, such container means 66 extending substantially the entire axial extent of the shaft 58 between the end walls 20 and 22 with due allowance being made for free running clearance. The shaft 58 has an end portion 68 projecting into the auxiliary housing 44, and power means disposed in the auxiliary housing 44 and designated generally at 70 is connected to the end portion 68 of the shaft 58 for rotating the latter.

The power means 70 comprises an electric motor 72 mounted on the channel 46 with the motor output shaft 74 being connected to the input shaft 76 of a gear reduction box 78 via a coupling 80. The gear reduction box 78 is, like the motor 72, mounted on the channel 46. The output shaft 82 of the gear reduction box 78, and the shaft end portion 68 are respectively provided with a small sprocket 84 and a relatively large sprocket 86, and a drive chain 88 is entrained over the sprockets 84 and 86, it being understood that the sprockets are fixed to their respective shafts 82 and 68. The arrangement is such that when the electric motor 72 is energized, the shaft 58 is positively driven to rotate at a smaller angular velocity, preferably on the order of a fraction of a revolution per second. Preferably, the rate of rotation of the shaft 58 lies within the range of about 6 revolutions per minute to about 30 revolutions per minute, with 15 revolutions per minute being especially preferred. Preferably, though not necessarily, the electric motor 72 is of the conventional unibrake type that is characterized by the inclusion of means for braking the output shaft 74 against rotation whenever the motor 72 is deenergized. Provision of a motor of this type substantially precludes any coasting or continued rotation of the shaft 58 after the motor 72 is deenergized. Means for controlling the energization of the motor 72 will be subsequently described.

Figures 4, 5:
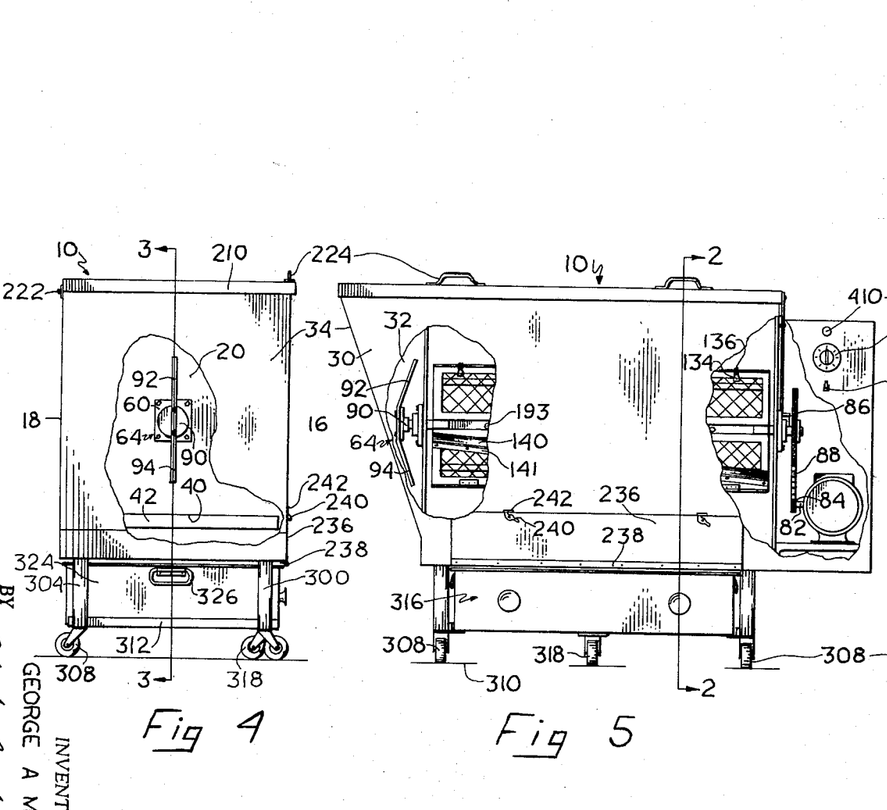
FIG. 4 is an end view of the breading machine, this view being taken from the hopper end of the machine, and with a portion of the wall of the hopper being broken away to show the breading agitator.
FIG. 5 is a front elevational view of the breading machine, with portions being broken away to reveal details of the agitator, the perforated container means, and the power drive means for the agitator and the container means.

As best shown in FIGS. 4 and 5, the agitator means 64 comprises a hub 90 fixed to the shaft 58 for rotation therewith, such hub being provided with a pair of radially extending arms 92 and 94 that are diametrically opposed in their positioning on the hub 90, and as clearly shown in FIG. 5, such arms 92 and 94 are bent so that the radially outermost portions of their extent are inclined toward the housing end wall 20. The arrangement is such that each of such arms is directed generally toward the hopper discharge opening 42 during the lowermost portion of the travel of the arm. With this construction, the agitator 64 tends to prevent any caking or solidification of the breading in the hopper chamber 38 while also tending to urge breading from the hopper 28 through the opening 42 and into the lower portion of the breading chamber 26. The provision of the agitator 64 is optional and its use for the most part unnecessary in view of tests that have been performed with an actual working model of the breading machine 10. As a result of the tests, it appears that the agitator 64 may be required only when the breading is moist or is such as to have a greater cohesive tendency than that possessed by the breading used in the tests.

The container means 66 is comprised of two identical container units 100 and 102 that are disposed on opposite sides of the shaft 58. The container units 100 and 102 are related to each other in such a manner and are positioned with respect to the shaft 58 in such a manner that the axis of the shaft 58 constitutes a line of symmetry as to such units 100 and 102. Accordingly, a detailed description of the container unit 102 will suffice for both of the units 100 and 102.

Figure 1:
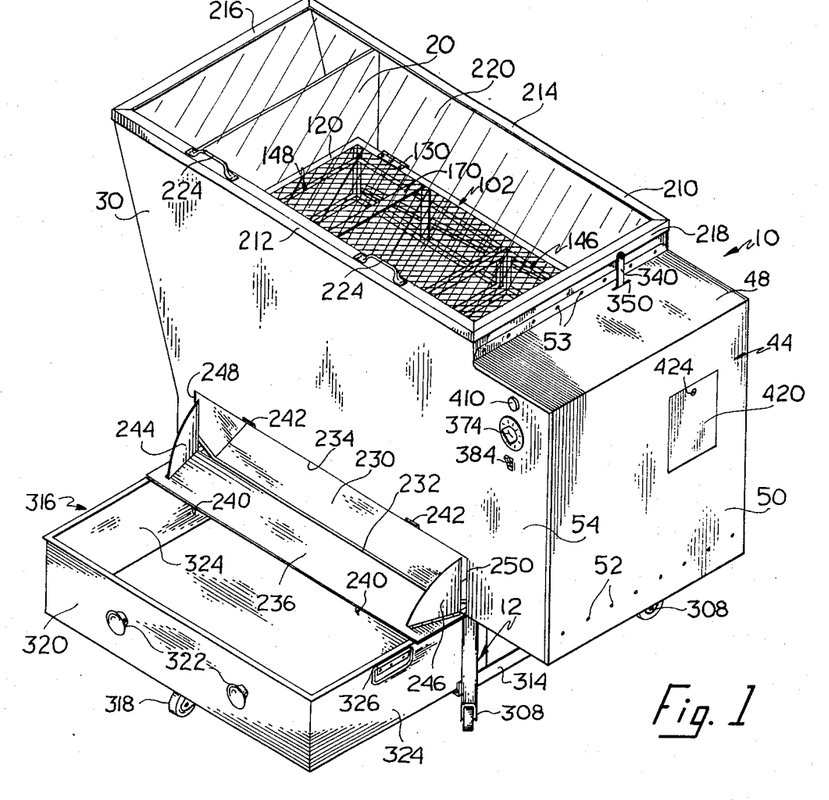
FIG. 1 is an isometric view of the breading machine, this view showing the breading discharge door open for discharging breading into the breading drawer shown in its extended or breading receiving position.
Figure 2:
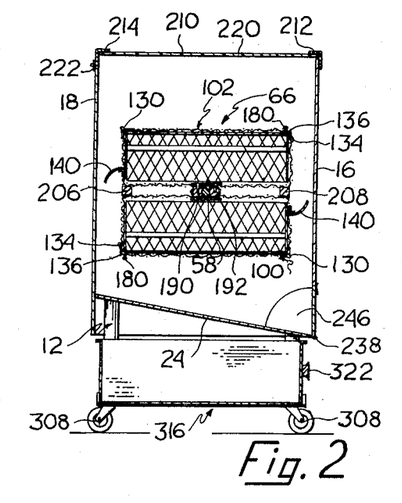
FIG. 2 is a vertical sectional view of the breading machine shown in FIG. 1, this view being taken upon the plane of section line 2—2 in subsequently described FIG. 5 with the breading discharge door and the drawer being respectively shown in their closed and retracted positions.
Figures 8, 9:
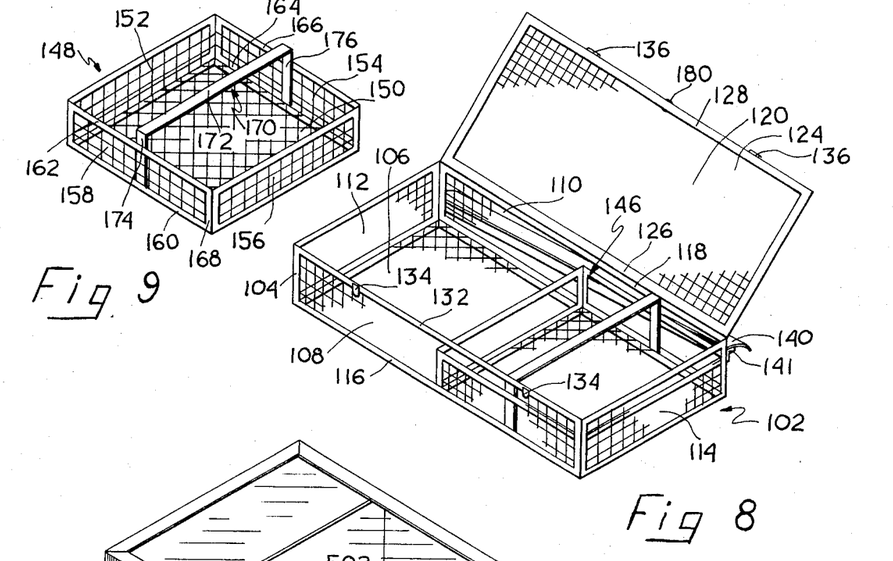
FIG. 8 is an isometric view of one of the receptacles showing the cover thereof in open position, and also showing one of the baskets which it is adapted to receive being disposed therein.
FIG. 9 is an isometric view of one of the baskets such as the basket shown disposed in the receptacle in FIG. 8.

The construction of unit 102 will be best appreciated upon reference to FIGS. 1, 8 and 9. The unit 102 is comprised of an open-topped receptacle 104 of generally rectangular configuration in all of its dimensions, the same including a bottom wall 106, upstanding front and rear walls 108 and 110, and upstanding end walls 112 and 114. All of the walls 106, 108, 110, 112 and 114 are of perforate or reticulated character so as to permit substantially free ingress and egress of the finely divided breading material, and preferably such walls are made of expanded stainless steel sheet stock. For rigidity of construction, all the junctures of such walls with each other as well as the upper edges of the walls 108, 110, 112 and 114 are reinforced with stainless steel strips conformable to such junctures or edges, such as the strip 116 at the juncture of the bottom wall 106 with the front wall 108, and such as the strip 118 disposed along the upper edge of the rear wall 110. The walls and strips can be securely joined in any suitable manner, such as spot welding or by brazing.

The receptacle 104 is provided with a perforate or reticulated cover 120 for selectively opening and closing the open top of the receptacle 104, such cover 120 being comprised of a perforate wall 124 in the form of an expanded stainless steel sheet, such wall 124 of the cover being peripherally framed and reinforced by stainless steel strips such as those indicated at 126 and 128. The cover 120 is hingedly connected by a plurality of spaced stainless steel hinges such as the hinge indicated at 130 in FIG. 1, such hinge 130 being suitably secured to the steel strips 118 and 126 of the receptacle 104 and the cover 120, respectively.

The upper edge of the front wall 108 is reinforced by a steel strip 132, and such steel strip 132 and the steel strip 128 of the cover 120 are provided with conventional coacting latch means 134 and 136, whereby the cover 120 can be latched in position closing the top of the receptacle 104.

For a purpose to be presently explained, a vane 140 is attached to and extends rearwardly from the rear wall 110 of the receptacle 104. The vane 140 is preferably flexible and, except for a stainless steel angle strip 141, is made of neoprene. The angle 141 of the vane 140 is secured to the rear wall 110 in any suitable manner and the vane 140 extends the entire length of the rear wall 110 and is preferably inclined upwardly to the right when the same is viewed from the rear of the receptacle 104, the inclination being such that the left end of the vane 140 (when the receptacle 104 is viewed from the rear) is adjacent the lower edge of the rear wall 110 while the righthand end of the same is adjacent the upper edge of the rear wall 110.

The container unit 102 also includes a pair of rectangular baskets such as the baskets of perforate or reticulated character designated generally at 146 and 148 in FIGS. 8 and 9. As readily apparent upon inspection of the drawings, the baskets 146 and 148 are identical and are of generally rectangular configuration. The length and width of the terminal dimensions of the receptacle 104 are such as to removably receive therein in side by side relationship both of the baskets 146 and 148. The overall length and width of the baskets 146 and 148 when they are positioned side by side within the receptacle 104 substantially corresponding to the corresponding internal dimensions of the receptacle 104, but with free running clearance therebetween so that either one of the baskets 146 and 148 can be easily moved into and out of the receptacle 104 vertically. If desired or deemed expedient, the baskets 146 and 148 can be square rather than rectangular, whereby a basket can be removed from the receptacle and then replaced within the receptacle after rotating the same about its vertical axis 90°.

As the baskets 146 and 148 are identical, a detailed description of the basket 148 will suffice for both. The basket 148 is comprised of a bottom wall 150 that is of rectangular configuration and peripherally attached to upstanding side walls 152, 154, 156 and 158. As in the case of the receptacle 104, the walls 150, 152, 154, 156 and 158 are of perforate character and preferably of expanded stainless steel. Also, as in the case of the receptacle 104, the junctures of the walls of the basket 148 are reinforced and joined by reinforcing strips of stainless steel such as those indicated at 160, 162, 164, 166 and 168. The basket 148 includes a handle 170 therefor which is comprised of an inverted U-shaped member of stainless steel that includes a web portion 172 that joins depending legs 174 and 176. The handle 170 is centrally disposed relative to the other elements of the basket 148, and the legs 174 and 176 are positioned along the adjacent faces of the side walls 158 and 154 and are securely attached to the strips 160 and 162 and the strips 164 and 166 respectively. The basket 146 is fabricated by generally the same techniques mentioned above as to the receptacle 104.

It is to be noted that the lengths of the handle legs 174 and 176 are greater than the heights of the side walls 158 and 154 so that the web portion 172 of the handle 170 is spaced above or occupies a position of greater height than the upper edges of the side walls of the basket 148. The overall height of the basket 148 including its handle 170 is approximately but slightly less than the internal height of the receptacle 104 when its cover 120 is closed. It will be understood by those skilled in the art that when the baskets 146 and 148 are disposed within the receptacle 104 and the cover 120 is latched in its closed position, the baskets 146 and 148 will be retained within the receptacle 104 with the cover 120 preventing or closely limiting any vertical freedom of movement of the baskets.

The cover 120 is provided with a small finger grip or handle 180 at the center of its free edge for convenience in raising and lowering the cover 120.

It is preferred that the container unit 102 be of stainless steel construction, excepting the rib or vane 140 which is (aside from a stainless steel angle strip 141, by means of which it is mounted on the receptacle 104) made of an elongated strap or ribbon of neoprene that is somewhat arcuate in transverse cross section as shown in the drawings.

Figure 7:
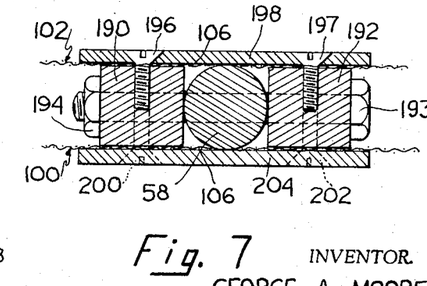
FIG. 7 is an enlarged fragmentary sectional detail view illustrative of the means provided for mounting the receptacles on the rotatable shaft.

The container units 100 and 102 are fixed to the shaft 58 by means best shown in FIG. 7, wherein it will be seen that a pair of bars 190 and 192 substantially coextensive with the container means 66 in axial length abut and are securely fixed to the shaft 58 on the opposite sides of the latter by means of bolts 193 extending therethrough and nuts 194. The bars 190 and 192 have a thickness the same as the diameter of the shaft 58. If desired or deemed expedient, the shaft 58 can be rectangular in cross section in its extent corresponding to the axial extent of the container means 66. The bottom walls 106 of the container units 100 and 102 are seated respectively against the lower and upper faces of the assembly constituted of the shaft 58 and the bars 190 and 192 attached thereto, with the unit 102 being secured by means of rows of countersunk screws 196 and 197 extending through a plate 198 on the top of the bottom wall 106, the bottom wall 106 and into the bars 190 and 192 as shown. Similarly, the unit 100 is secured by rows of countersunk screws 200 and 202 extending through a plate 204, the bottom wall 106 of the receptacle 104 of such unit 100 and into the bars 190 and 192.

In order to further stabilize the units 100 and 102, the adjacent side edges of the receptacles 104 of the units 100 and 102 are attached to spacing bars 206 and 208.

A lid 210 is provided that is common to both the housing 14 and the hopper 28. The lid 210 is comprised of an open rectangular frame comprised of forward and rear sides 212 and 214, and ends 216 and 218. Such open rectangular frame is made of stainless steel and constitutes a frame supporting a transparent rectangular plate 220. The transparent plate or window 220 is preferably of a common acrylic resin that is widely marketed under well known trademarks.

The lid 210 is disposed over the housing 14 and the hopper 28, and the rear edge of the same is hinged to the upper edge of the rear wall 18 and its extension 32 by conventional hinge means 222. Handles 224 are secured to the frame element 212 of the lid 210, whereby the same can be conveniently raised and opened from the closed position shown thereof in FIGS. 1 and 2.

The transparent plate or window 220 enables visual inspection of the level of breading in the hopper 28, as well as of the level of breading in the housing 14 and the operation of and the condition of the contents of the container means 66 when the lid 210 is closed.

Means is provided to enable the convenient discharge or removal of breading from the housing 14. Such means comprises the provision of an opening 230 in the front housing wall 16 extending horizontally for substantially the axial extent of the housing 14, and vertically from the juncture 232 of the front wall 16 and the bottom wall 24 to a position 234 spaced thereabove. A rectangular door 236 is provided for the opening 230. The door 236 is hinged along its lower edge to the housing front wall 16 immediately below the opening 230 at 238 for forward and downward swinging movement of the door 236 from the closed position shown thereof in FIGS. 2 and 4 to an open position thereof shown in FIG. 1. The upper edge of the door 236 and the front wall 216 are provided with coacting latch means 240 and 242 for selectively latching the door 236 in its closed position.

The rear side of the door 236, that is, the side of the door 236 facing the interior of the housing 14 when the door 236 is closed is provided with flanges 244 and 246 adjacent the opposite ends of the door 236. The flanges 244 and 246 extend into the housing 214 when the door 236 is closed, and occupy upstanding positions such as clearly shown in FIG. 1 when the door 236 is open. The flanges 244 and 246 are inclined with respect to the door 236 in that they converge from the hinged or lower edge of the door 236 so as to constitute in conjunction with the door 236 a discharge chute when the door 236 is opened. In the function of the flanges 244 and 246 as the upstanding sides of a discharge chute, it will be noted that the edges of the flanges nearest the bottom or hinged edge of the door 236 are closely spaced to the opposite ends 248 and 250 of the opening 230 when the door 236 is open. If desired or deemed expedient, the rear upstanding edges of the flanges 244 and 246 as viewed in FIG. 1 can be attached by flexible strips or bellows, not shown, to the inner face of the front wall 16 adjacent the ends 248 and 250 of the opening 230 in order to further prevent any leakage of breading on discharging the same from the housing 14 through the discharge chute constituted of the open door 236 and the flanges 244 and 246.

Means is provided for receiving breading discharged from the housing 12 through the chute constituted of the door 236 and the flanges 244 and 246 attached to the door 236. Such means comprises the frame 12 including a pair of front support legs 300 and 302 that extend downwardly from the housing 14 and a pair of corresponding rear legs 304 and 306. As clearly shown in the drawings, the lower ends of the frame support legs 300, 302, 304 and 306 are provided with caster wheels 308, whereby the breading machine 10 can be conveniently wheeled about and turned upon a supporting floor surface 310 as desired.

An angle guide or drawer support member 312 is attached to the legs 300 and 304 adjacent to the lower ends of the latter, the guide 312 being on the side of the legs 300 and 304 adjacent the other legs 302 and 306. In a similar manner, a guide 314 similar to the guide 312 is attached to the legs 302 and 306 adjacent the lower ends of the latter. A drawer designated generally at 316 is guidingly supported upon the guides 312 and 314. The drawer 316 is normally disposed directly below the housing 14, but is slidable upon the guides 312 and 314 forwardly horizontally from beneath the housing 14. So that the drawer 316 will have floor support for the forward portion thereof as it is extended forwardly of the frame 12 and the support guides 312 and 314, the drawer 316 is provided with a caster support wheel 318 that is in engagement with the floor surface 310 when the drawer 316 is in its normal retracted position shown thereof in FIGS. 4 and 6, and is also disposed so as to be in contact with the supporting floor surface 310 when the drawer 316 is forwardly extended as shown in FIG. 1. As will be evident to those skilled in the art, the drawer 316, if deemed expedient or otherwise desirable, can also be provided with additional caster support wheels, not shown, adjacent the rear end of the drawer 316 for engagement with the support surface 310.

In order to facilitate extension of the drawer 316 from its normal position beneath the housing 14, the front wall 320 of the drawer 316 is provided with a pair of drawer pulls 322.

When the drawer 316 is extended to the position shown thereof in FIG. 1 so that the front portion of the drawer 316 is supported by the caster wheel 318 and the rear of the drawer 316 is supported by the guides 312 and 314, it will be seen that the drawer 312 is in a position to receive breading discharged from the housing 314 through the opening 230 and over the chute constituted of the open door 236 and its flanges 244 and 246. Also, since the width of the drawer 316 is less than the length of the door 236, the upper edges of the side walls 324 of the drawer 316 support the door 236 and prevent further downward swinging movement of the door 236.

The drawer 316, which as is obvious upon inspection of the drawings, is in the form of an open-topped shallow rectangular box, and can be removed from the remainder of the breading machine 10, and to facilitate such removal and the carrying of the same and its contents, the drawer 316 is provided with a pair of carrying handles 326 fixed to the side walls 324. The drawer 316 is of metallic construction, and the preferred material is stainless steel inasmuch as the same will be in contact with breading.

Means is provided for limiting opening swinging movement of the lid 210 to slightly in access of 90° from its closed position, so that the lid can be held open gravitationally. Such means comprises an arm 340 having one end pivoted at 342 to the frame element 218 of the lid 210 at a position spaced from the axis of the hinge means 222. The arm 340 is provided with an elongated slot 344 therein through which is slidingly received the radially reduced portion of a headed stud 346 fixed to the end wall 22 of the housing 14. The position of the lower end 348 of the slot 344 serves to limit in coaction with the stud 346 the extent to which the door 210 can be opened. The top wall 48 of the auxiliary housing 44 is provided with a narrow slot 350 through which the arm 340 is freely accommodated in its movements. The arrangement is such that the lower end of the arm 340 extends downwardly into the auxiliary housing 44 adjacent the exterior of the housing end wall 22.

It will be evident that the lower end 352 of the arm 340 travels along an arcuate path during opening and closing movements of the lid 210, and the arrangement is such that the end 352 of the arm 340 moves into the lowermost position occupied thereby when the lid 210 is closed. For a purpose to be presently explained, a normally open microswitch 356 is mounted on the housing wall 22 in a position such that the actuating element or button 358 thereof is engageable by and is depressed to close the switch 356 by the lower end 352 of the arm 340 when the latter is in its lowermost position, that is when the lid 210 is in its closed position.

Figure 10:
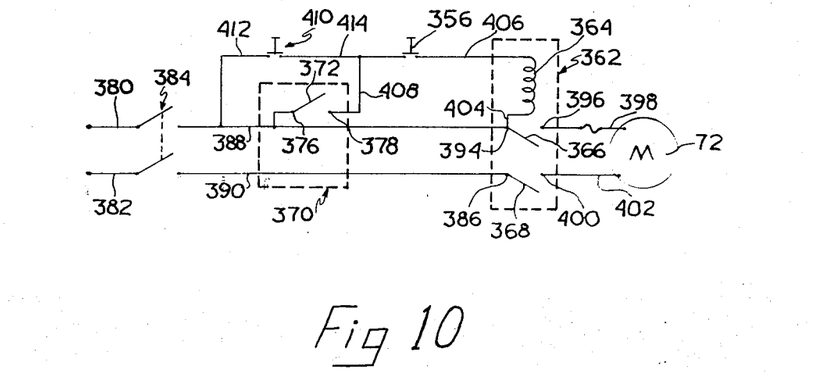
FIG. 10 is a schematic diagram of the electrical system of the breading machine; and, FIG. 11 is an isometric view of a modified form of the breading machine, such modified form of the breading machine employing an alternative form of container means and the housing thereof being provided with an additional door for discharging or charging the container means.

Attention is now directed to the schematic diagram shown in FIG. 10 which sets forth the control system for controlling energization of the electric motor 72. The control system comprises a motor relay 362 that includes an actuating solenoid 364 and a pair of normally open motor relay switches 366 and 368. The control means also includes a conventional timer switch 370, which can be either of the mechanical spring driven or electrically driven type, such timer switch means 370 including a normally open timer controlled switch 372 that is closed during a selectable time interval following adjustment of the control knob 374 (see FIG. 5) and after the elapse of such time interval such switch 372 is returned to its normally open position. The switch 372 includes terminals 376 and 378. Power leads 380 and 382, which are adapted to be connected to a suitable source of alternating current supply (not shown), are respectively connected through a conventional double-pole, double-throw electric switch means 384 respectively to the terminal 376 of the timer switch 372, and to the terminal 386 of the relay switch 368 respectively by leads 388 and 390. The lead 388 is connected to a lead 392 which in turn is connected to the terminal 394 of the relay switch 366. Terminal 396 of the switch 366 is connected by a fused lead 398 to the motor 72, and the terminal 400 of the switch 368 is connected by a lead 402 to the motor 72. The arrangement is such that the motor 72 is energized whenever the relay switches 366 and 368 are closed (as caused during energization of the solenoid 364), provided the master control switch 384 is also closed. One terminal of the solenoid 364 is connected to the switch terminal 394 by a lead 404, and the other terminal of the solenoid 364 is connected to the timer switch terminal 378 by a lead 406 and a lead 408. The microswitch 356 is disposed in the lead 406, the arrangement being such that the solenoid 364 can only be energized by closure of the timer switch 372 when the microswitch 356 is closed in response to the lid 210 being closed.

The timer switch 372 is connected in electrical parallel with a normally open push button switch means indicated at 410 by means of leads 412 and 414 respectively connected to the leads 388 and 406.

Assuming the master off-and-on switch 384 to be closed the motor 72 cannot be energized unless the normally open microswitch 356 is closed by closure of the lid 210. Further assuming the microswitch 356 to be closed, closure of either the timer switch 372 or the push button switch 400 will result in energization of the solenoid 364 and consequent closure of the switches 366 and 368 so as to energize the motor 72.

In order that the power drive means 70 can be conveniently inspected and in order that minute adjustment of the vertical position of the microswitch 356 as to its vertical position relative to the arm 340 can be readily effected (proper adjustment assumes that the motor 72 can only be energized when the lid 210 is either fully closed or in very close proximity to its fully closed position), the wall 50 of the auxiliary housing 44 is provided with an inspection opening normally closed by an inspection plate 420 that is releasably retained in position by a threaded fastener 424.

The operation of the breader 10 will be readily understood. After the housing has been initially filled with breading to a level preferably high enough to include a lower portion of the cylinder of revolution of the receptacles, and after the hopper has been filled, the lid 210 is closed as well as the master switch 384, and the push button switch 410 is actuated momentarily or pulsed to whatever extent necessary to rotate either one or the other of the two container units 100 or 102 to an upright position. The cover of such then uppermost unit is unlatched and opened and the baskets of such unit are removed and filled with cut chicken or the like to the level of the top of the perforated side walls thereof. The baskets with their contents are then returned into the receptacle of such uppermost unit and the cover closed and latched. The lid 210 is then closed and the push button 410 again momentarily depressed to such an extent as to place the other unit uppermost so that the baskets thereof can be charged with cut chicken or the like in the manner previously performed with respect to the other unit.

As mentioned previously, the hopper 28 is charged with breading, and the housing 14 is filled with breading at least to such an extent that the vanes of the container units will extend down thereinto upon rotation of the shaft 58.

With the switch 384 on (that is closed) and the lid 210 closed, the knob 374 of the timer means 370 is turned to preset the interval during which it is desired that the switch 372 be closed. Normally such time interval will be for a period such as about one-half minute to about 3 minutes. As soon as the timer switch 370 is adjusted for the desired time interval for the breading cycle, the motor 72 is energized with consequent rotation of the shaft 58. Rotation of the shaft 58 actuates operation of the agitator (if the latter is included in the machine 10) and causes rotation of the container means 66 in the housing 14. The perforate character of the container means 66 admits of substantially free ingress and egress of breading with respect to the container means 66 and specifically the ingress and egress of breading into the interiors of the baskets included in the container means. The vanes serve to dip into the breading in the housing 14 with their concave sides leading and to elevate portions of the breading during travel of the vanes until the vanes are near the uppermost part of their travel paths at which time the breading elevated by the vanes falls gravitationally down upon and into the container means with the result that the breading passes down into the pieces of cut chicken within the container means 66. With the baskets filled approximately to the level of the vertical extent of the perforate walls thereof, there will be free space radially outward from the contained pieces of chicken and the latched covers of the container means, whereby a modest degree of tumbling of the cut chicken or the like will occur within the container means by reason of such free space. Such tumbling serves to spread breading from piece to piece to assure a uniform coating, and also serves to expose all surfaces to the coating action.

Figure 6:
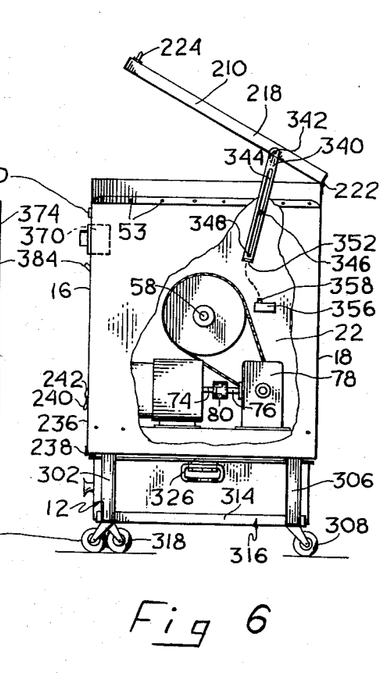
FIG. 6 is an end view of the breading machine, this view showing the lid partially raised, and having portions broken away to reveal details of the power drive means and of the relationship of the lid bracket to a microswitch for preventing machine operation when the lid is raised.

By virtue of the inclination of the vanes relative to the container means, and in view of the fact that the direction of drive of the shaft 58 is clockwise as viewed in FIG. 6, the vanes not only serve to elevate and gravitationally discharge breading material as described, but the vanes also urge breading axially in the housing 14 from the hopper toward the other end of the housing 14, and thereby facilitates feed of breading from the hopper into the housing.

Preferably, though not necessarily, the housing 14 contains such an amount of breading that the receptacles of the container means will, in addition to the vanes attached thereto, dip downwardly into or pass through breading during the lowermost part of their travel. This further assures the ingress of breading into the container means during rotation of the latter.

After elapse of the preset time interval, the timer switch 372 opens with consequent deenergization of the motor 72. The push button 410 is then actuated to whatever extent necessary to bring one of the container units into an upright and uppermost position, whereupon the lid 210 is opened, and the baskets of such uppermost unit are removed and the cut pieces of chicken which have been breaded are removed and replaced by unbreaded pieces. The refilled baskets are replaced in the uppermost unit and the cover thereof latched. The lid 210 is then closed and the button 410 actuated to such an extent as to position the other container unit uppermost and the same discharged of its breaded contents and recharged with unbreaded pieces of chicken or the like. After the cover of the uppermost unit has been latched in position, the cover 210 is again closed and the timer reset for another cycle of breading.

The above described mode of operation of the breader 10 is, of course, only one of many variations of which the machine 10 is capable. It will be evident that the breading machine 10 can be operated in such a manner that less than all four of the baskets are charged for breading of their contents during any one cycle of operation. The very substantial capacity of the machine 10 will enable a very high average rate of the breading of chicken or the like such as when the machine is used in conjunction with one or more of the automatic deep-fat pressure cookers currently coming into such wide scale use in the restaurant service industry. While the machine 10 is capable of meeting the very high rate of demand for breaded chicken or the like for use in such cookers, the same is capable of an appropriate rate of performance when the demand is reduced as during relatively slack intervals of consumer demand. Whether a large or relatively small quantity of chicken is to be breaded during a breading cycle, the duration of a cycle is largely unchanged.

The radial extents of the vanes are such as to pass in close proximity to the bottom and front walls of the housing, with the result that balls or lumps formed in the breading tend to become broken up or dissipated. Such balls that are not broken up tend to be urged toward the discharge door for convenient removal. In this regard it is preferred that the direction of drive be such that the vanes travel toward the discharge door during the lower portion of their travel paths.

Complete discharge of breading from the housing into the drawer can be readily effected as will be evident. Such discharge can, if desired, include the breading in the hopper, it being noted that the electric motor can be energized while the discharge door is open with the resulting agitator action tending to empty the hopper. With the motor off, a small rake or wiper, not shown, can be used to sweep the breading from upon the sloping bottom wall into the drawer. With the housing and hopper discharged of breading, the machine can be wheeled to a position over a sewer drain, and the interiors thereof thoroughly cleaned in any suitable manner. It will be noted that the interiors and contents of the hopper and the housing will readily drain clear of any cleaning liquid and rinsing water sprayed thereinto.

The drawer with its breading contents can be conveniently stored as desired, such as under refrigeration. Indeed, the drawer and its contents can be placed in a drying oven as a step in the reconditioning of excessively moist or balled breading.

Figure 11:
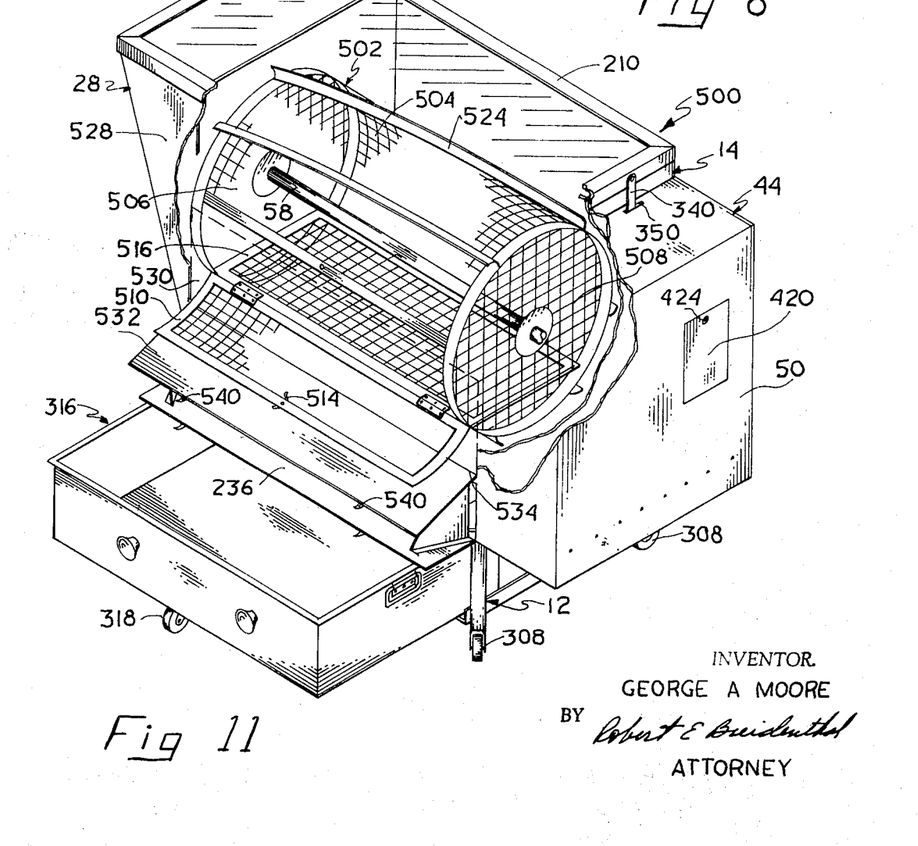

Attention is now directed to a modified form of breader or breading machine designated generally at 500 in FIG. 11. The breading machine designated at 500 is substantially identical to the previously described machine 10 except that the machine 500 employs a different form of container means for rotation by the shaft 58 in lieu of the previously described container means 66, and by a single additional departure constituted of the machine 500 having an additional door disposed above the previously described door 236.

The alternative form of container means used in the breading machine 500 is designated generally at 502, and the same comprises a generally cylindrical wall 504 formed of expanded stainless steel sheet so that the container means 502 is perforate. The opposite ends of the cylindrical wall are closed by perforate discs 506 and 508 which are centrally fixed to the shaft 58 for rotation therewith. A portion of the cylindrical wall 504 is constituted of a door 510 hinged along one edge as indicated at 512 for radially outward swinging movement of the door 510 from its closed position. Conventional latch means 514 are provided for releasably securing the door 510 in its closed position.

A plurality of vanes 524 are secured to the exterior of the perforate wall 504 so as to extend radially outwardly therefrom. The vanes 524 are preferably of neoprene in the form of long strips or ribbons thereof that are arcuate in transverse cross section. The vanes 524 extend the entire length of the container means 502 and are attached to the wall 504 with a degree of pitch, that is, the vanes 524 are in their axial extent somewhat of a helical configuration.

In the preferred construction, the interior of the cylindrical container means 502 is provided with a planar partition wall 516 disposed in a plane parallel to the shaft 58. The partition wall 516 is perforate and has one edge disposed closely adjacent the hinges 512. The wall 516 is substantially horizontal when the apparatus is in the position shown in FIG. 11, whereby the removal of breaded articles is made easier, and whereby such articles are not surrounded by breading even when the container means 502 is partially immersed in breading.

The front wall 528 of the machine 500 is, except as hereinafter described, identical to the front wall 16 of the machine 10, and is provided with an opening 530 that is disposed above the opening 230 and the door 236, such opening 530 being provided with a door 532 hingedly connected along its lower edge of 534 to the front wall 528.

The door 532 is provided with conventional latch means 540 for latching the same in closed position. The arrangement of the door 510 of the container means 502 with respect to the door 532 is such that when the latter door is opened and the container means 502 rotated into proper angular position, the door 510 of the container means 502 can be swung outwardly through the opening 520 as shown in the drawings. With the door 510 opened through the opening 530, cut pieces of chicken to be breaded or which have already been breaded can be easily placed in or removed from the container means 502 as will be evident. It is not essential that the machine 500 be provided with the opening 530 and the door 532 therefor inasmuch as the door or cover 510 can be opened when the container means 502 has been rotated into proper position when the cover 210 is open for the convenient placement of cut chicken into the container means 502 or for the convenient removal of pieces of chicken that have been breaded.

The operation of the breading machine 500 will be readily understood in the light of the previous description of the breading machine 10.

The vanes 524 serve to axially move breading material by reason of their helical configuration and additionally elevate and gravitationally discharge breading upon the top of the container means 502 so that breading will enter the container means 502 and pass through and among pieces of chicken that are being tumbled within the container means 502 by reason of rotation of the latter.

It is preferred that all structural components of both breading machines 10 and 500 that come in contact with breading be of stainless steel wherever possible. Such structural material for the housings and the container means and the drawers assures freedom from corrosion and is a material well suited for easy cleaning and maintaining a completely hygienic or sanitary condition.

I claim:

1. A breading machine comprising an open-topped housing defining a breading chamber therein adapted to contain breading, container means within the chamber for containing food articles to be breaded, means for mounting the container for rotation about a horizontal axis, said container means having an access opening, said container means including cover means for selectively opening and closing said opening, said container means being perforate for the ingress and egress of breading, radially extending vane means on the container means for elevating breading in the chamber and thence gravitationally discharging elevated breading onto the container means during rotation of the latter, power means including an electric motor for rotating the container means, and means for controlling energization of said electric motor, said last means including timer means for energizing the motor for a selected interval, said container means being of cylindrical configuration and having an axis coincident with said horizontal axis, and said container means having a perforate and substantially planar partition wall therein that extends along an edge of said access opening, said axis being parallel to the plane of the partition wall.

2. The combination of claim 1, wherein the housing has a lid mounted thereon for movement between positions opening and closing the open top thereof, and wherein the means for controlling energization of said electric motor includes means for preventing energization of said electric motor in response to the lid being in other than its closing position.

3. A breading machine comprising an open-topped housing defining a breading chamber therein adapted to contain breading, reticulated container means within the chamber for containing food articles to be breaded, means for mounting the container for rotation about a horizontal axis, said container means having an access opening, said container means including reticulated cover means for selectively opening and closing said opening, radially extending vane means on the container means for elevating breading in the chamber and thence gravitationally discharging elevated breading onto the container means during rotation of the latter, power means including an electric motor for rotating the container means, and means for controlling energization of said electric motor, said last means including timer means for energizing the motor for a selected interval, said container means being of cylindrical configuration having an axis coincident with said horizontal axis, said housing including a front wall having an opening therein, a door for closing the opening in the front wall, said door being hinged at its lower edge to the front wall for opening movement forwardly and downwardly from its closing position, said cover means being hingedly connected for forward and downward movement into the opening in the front wall when the container means is rotated to place its access opening into substantial registry with the opening in the front wall and when the door for the opening in the front wall is open.

4. The combination of claim 3, including hopper means for feeding breading into the breading chamber adjacent an axial end of the container means, said vane means having a helical configuration along the axial extent of the container means, whereby the vane means imparts an axial movement to breading in the chamber from the hopper means during rotation of the container means, a frame supporting the housing, a drawer disposed below the housing, and means for mounting the drawer on the frame for forward sliding movement to a position forwardly of the door when the latter is open.

5. The combination of claim 4, wherein the housing includes a bottom wall defining the bottom of the breading chamber, said front wall being provided with a second opening located below the first mentioned opening therein, and a door for closing said second opening, said second opening being constructed and arranged with respect to the bottom wall and the drawer, when the latter is moved to its position forwardly of the door, that breading can be discharged from the chamber through the second opening and into the drawer.

6. A breading machine comprising an open-topped housing defining a breading chamber therein adapted to contain breading, reticulated container means within the chamber for containing food articles to be breaded, means for mounting the container for rotation about a horizontal axis, said container means having an access opening, said container means including reticulated cover means for selectively opening and closing said opening, radially extending vane means on the container means for elevating breading in the chamber and thence gravitationally discharging elevated breading onto the container means during rotation of the latter, power means including an electric motor for rotating the container means, means for controlling energization of said electric motor, said last means including timer means for energizing the motor for a selected interval, said container means and the means for rotatably mounting the container means comprising a horizontal shaft rotatably mounted on the housing, a receptacle mounted on the shaft for rotation therewith, said receptacle extending radially from the shaft and being open at its radially outermost end to constitute said access opening, a lid mounted on the housing for movement between positions opening and closing the open top thereof, wherein the means for controlling energization of the electric motor includes means for preventing energization of said electric motor in response to the lid being in other than its closing position, the container means including a reticulated basket removably received radially in the receptacle through the access opening, said basket being entirely received within the receptacle and retained therein by the cover means when the latter is closed, and hopper means for feeding breading into the breading chamber adjacent an axial end of the container means, said vane means having a helical configuration along the axial extent of the container means, whereby the vane means imparts an axial movement to breading in the chamber from the hopper means during rotation of the container means, a frame supporting the housing, a drawer disposed below the housing, and means for mounting the drawer on the frame for forward sliding movement to a position forwardly of the door when the latter is open.

7. A breading machine comprising an open-topped housing defining a breading chamber therein, a horizontal shaft journaled in the housing and extending through the chamber, power means for rotating the shaft, a pair of open-topped reticulated receptacles in the chamber and having their bottoms fixed in diametrically opposed relation to the shaft, each of said receptacles having a reticulated cover for its open top together with means for releasably securing the cover in closed position, each of said receptacles having a reticulated basket removably received therein, lid means for selectively closing the open top of the housing, a frame supporting the housing, a drawer normally disposed below the housing, means on the frame mounting said drawer for forward movement from below the housing to a breading receiving position, said housing having a breading discharge opening adjacent the bottom of the housing, and a combination door and discharge chute means pivotally mounted on the housing for movement between first and second positions, said combination means, when in its first position, closing said discharge, and, when in its second position, opening said discharge opening and constituting a chute for directing breading from the breading chamber into the drawer when the drawer is in its breading receiving position.

8. The combination of claim 7, wherein the drawer is provided with a support wheel and handle support means.

9. The combination of claim 7, wherein the frame is provided with ground support wheels, and wherein the drawer is provided with a ground support wheel.

* * * * *